US009665842B2

(12) United States Patent
Hariharan et al.

(10) Patent No.: US 9,665,842 B2
(45) Date of Patent: May 30, 2017

(54) SUPPLY CHAIN MANAGEMENT ANOMALY DETECTION

(71) Applicant: GLOBALFOUNDRIES INC., Grand Cayman (KY)

(72) Inventors: Rajaraman Hariharan, Bangalore (IN); Krishnakumar Nagarajan, Singapore (SG); Kameshwaran Sampath, Bangalore (IN); Alfiya Tezabwala, Indore (IN); Vignesh Velusamy Ravindran, Chennai (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 567 days.

(21) Appl. No.: 14/025,312

(22) Filed: Sep. 12, 2013

(65) Prior Publication Data

US 2015/0074011 A1    Mar. 12, 2015

(51) Int. Cl.
*G06Q 10/00*    (2012.01)
*G06Q 10/06*    (2012.01)
*G06Q 10/08*    (2012.01)

(52) U.S. Cl.
CPC ... *G06Q 10/06315* (2013.01); *G06Q 10/0833* (2013.01)

(58) Field of Classification Search
CPC ................ G06Q 10/0833; G06Q 10/06315
USPC ........................................... 705/7.25
See application file for complete search history.

(56) References Cited

U.S. PATENT DOCUMENTS

| 5,687,224 | A  | * | 11/1997 | Alley, Jr. | ................ | H04M 3/22 |
|           |    |   |         |           |                  | 379/201.12 |
| 6,546,300 | B1 | * | 4/2003  | Fukuda    | ................ | G06Q 10/06 |
|           |    |   |         |           |                  | 700/100 |
| 7,072,843 | B2 |   | 7/2006  | Menninger et al. | | |
| 7,451,132 | B2 | * | 11/2008 | Ruml      | ................ | G06Q 10/06 |
| 7,457,785 | B1 | * | 11/2008 | Greitzer  | ................ | G01D 1/18 |
|           |    |   |         |           |                  | 706/12 |
| 7,657,777 | B2 |   | 2/2010  | Wong et al. | | |
| 7,716,077 | B1 |   | 5/2010  | Mikurak   | | |

(Continued)

OTHER PUBLICATIONS

Asif, et al., "Performance Analysis of the Closed Loop Supply Chain", Nov. 6, 2012, Journal of Remanufacturing 2012, 2:4, doi: 10.1186/2210-4690-2-4, <http://www.journalofremanufacturing.com/content/2/1/4/>.

(Continued)

*Primary Examiner* — Alan S Miller
*Assistant Examiner* — Folashade Anderson
(74) *Attorney, Agent, or Firm* — Scully, Scott, Murphy & Presser, PC (57) ABSTRACT

An integrated supply chain management with anomaly detection. An order schedule has one or more orders, each of which has a production requirement and a due date. An asset schedule has asset commitments associating assets with orders. Each asset has equipment specifications, including an asset class and one or more operational thresholds. The computer system identifies an asset of a class corresponding to a production requirement of an order and modifies the asset schedule to commit the asset to the order prior to the due date of the order. The computer system receives sensor input for the asset and determines whether an anomaly exists. If so, the computer system commits a second asset to the order.

7 Claims, 6 Drawing Sheets

(56) References Cited

U.S. PATENT DOCUMENTS

| | | | |
|---|---|---|---|
| 7,962,233 B2* | 6/2011 | Tiozzo | G05B 19/41865 700/100 |
| 8,046,090 B2 | 10/2011 | MacArthur et al. | |
| 8,229,791 B2 | 7/2012 | Bradley et al. | |
| 8,533,053 B2* | 9/2013 | Brown | G06Q 30/00 705/26.1 |
| 2003/0093388 A1* | 5/2003 | Albright | G06Q 10/08 705/400 |
| 2004/0254825 A1* | 12/2004 | Hsu | G06Q 10/06 705/7.24 |
| 2006/0101402 A1 | 5/2006 | Miller et al. | |
| 2008/0126860 A1* | 5/2008 | Sampath | G06F 11/0733 714/25 |
| 2010/0095158 A1 | 4/2010 | Shah-Hosseini | |
| 2011/0213636 A1* | 9/2011 | Sakuma | G05B 19/4183 705/7.25 |
| 2012/0287526 A1* | 11/2012 | Kasai | G11B 19/048 360/31 |
| 2013/0013454 A1* | 1/2013 | Sears | G06Q 30/06 705/26.41 |

OTHER PUBLICATIONS

Deng, et. al, "Study on Establishement of MES-based Real-Time Supply Chain Management Platform", 2012 IEEE 12th International Conference on Computer and Information Technology, Oct. 27-29, 2012, <http://ieeexplore.ieee.org/xpl/login.jsp?tp=&arnumber=6392024&url=http%3A%2F%2Fieeexplore.ieee.org%2Fxpls%2Fabs_all.jsp%3Farnumber%3D6392024>.

Dunbar, et al., "Distributed Model Predictive Control for Dynamic Supply Chain Management", Int. Workshop on Assessment and Future Directions of NMPC, Freudenstadt-Lauterbad, Germany, Aug. 26-30, 2005, <http://users.soe.ucsc.edu/~dunbar/docs/papers/WBD_NMPC05.pdf>.

Dutta, et al., "Effects of Information Feedback Loops on Supply Chain Performance", EC'03, Jun. 9-12, 2003, San Diego, California, USA. ACM 1-58113-679-X/03/0006, pp. 270-271, ACM, New York, <http://dl.acm.org/citation.cfm?id=779993&dl=ACM&coll=DL&CFID=144439848&CFTOKEN=92666878>.

Flapper, et al., "Managing Closed-Loop Supply Chains", 2005, XII, Springer, 214 p. 41 illus., <http://www.springer.com/business+%26+management/production/book/978-3-540-40698-3>.

Hebalkar, "Re-Architecting the Failure Analysis Supply Chain", Date issued 2007, <http://dspace.mit.edu/handle/1721.1/39487>.

NTT DATA Americas Home, Copyright 2013 NTT DATA, Inc., Printed on Jul. 17, 2013, <http://www.intelligroup.com/services/supply_chain_management.html> redirected to <http://americas.nttdata.com/>.

Ivanov, et al., "A multi-structural framework for adaptive supply chain planning and operations control with structure dynamics considerations", pp. 1-29, Reference provided in post disclosure comments by evaluator on Aug. 21, 2012, <https://www.tu-chemitz.de/wirtschaft/bw17/mitarbeiter/DMI/EJOR_$_{Ivanov}$_Revised_2.pdf>.

Jin, "Ontology-driven Coordination for Supply Chain System", Proceedings of 2005 IEEE International Conference on Natural Language Processing and Knowledge Engineering, IEEE NLP-KE '05, Oct. 31-Nov. 1, 2005, pp. 331-335, <http://ieeexplore.ieee.org/xpl/login.jsp?tp=&arnumber=1598757&url=http%3A%2F%2Fieeexplore.ieee.org%2Fxpls%2Fabs_all.jsp%3Farnumber%3D1598757>.

Kiekintveld, et al., "Distributed Feedback Control for Decision Making on Supply Chains", Fourteenth International Conference on Automated Planning and Scheduling, 2004, <http://web.eecs.umich.edu/~baveja/Papers/FinalICAPS04.pdf>.

Liu, et al., "Automatic Business Coordination in Supply Chains Using Semantic Web Service Composition", International Conference on Wireless Communications, Networking and Mobile Computing, WiCom 2007, Sep. 21-25, 2007, pp. 4830-4833, <http://ieeexplore.ieee.org/xpl/login.jsp?tp=&arnumber=4340959&url=http%3A%2F%2Fieeexplore.ieee.org%2Fxpls%2Fabs_all.jsp%3Farnumber%3D4340959>.

Liu, et al., "Implementation of Supply Chains Coordination Using Semantic Web Service Composition", SOCA '07 Proceedings of the IEEE International Conference on Service-Oriented Computing and Applications, 2007, pp. 249-254, IEEE Computer Society Washington, DC, USA, <http://dl.acm.org/citation.cfm?id=1271847>.

Ploegmakers, et al., "Feedback control for a multi-product flow line", SE Report: Nr. 2007-0I, Eindhoven, Jan. 2007,<http://www.google.co.in/url?sa=t&rct=j&q=Feedback+control+for+a+multi-product+flow+line&source=web&cd=1&cad=rja&ved=0CEUQFjAA&url=http%3A%2F%2Fmn.wtb.tue.nl%2F~lefeber%2Fdo_download_pdf.php%3Fid%3D94&ei=FZEzUIGkB6eQ2QXjxIDgAQ&usg=AFQjCNGvMx7pjhsKoFiACgWhspKmrRm3dw>.

Turner, "Exploring Critical Factors for Successful Closed-Loop Supply Chains with Remanufacturing", Jun. 2012, <http://conservancy.umn.edu/bitstream/132483/1/Turner_Kyle_June%202012.pdf>.

Wang, et al., "A Model Predictive Control Strategy for Supply Chain Management in Semiconductor Manufacturing under Uncertainty", Proceedings of the 2004 American Control Conference, Boston, Massachusetts Jun. 30-Jul. 2, 2004, pp. 4577-4582, <http://csel.asu.edu/downloads/Publications/Conference%20Proceedings/Supply%20Chain/wangetalACC04paper.pdf>.

IBM, "Envisioning the Future of Mining", White Paper, Oct. 2009, IBM Corporation, IBM Global Services, Somers, NY, USA.

IBM, "The Smarter Supply Chain of the Future", Global Chief Supply Chain Officer Study, Metals and Mining Edition, Apr. 2009, IBM Corporation, IBM Global Services, Somers, NY, USA.

* cited by examiner

SUPPLY CHAIN MANAGEMENT ANOMALY DETECTION

FIELD OF THE INVENTION

The present invention relates generally to the field of supply chain management, and more particularly to continuous process supply chain management.

BACKGROUND OF THE INVENTION

Supply chain management is the planning and management of all stages of a supply chain, from production to delivery. Supply chain management spans the movement and storage of raw materials, work-in-process inventory, and finished goods from point of origin to point of consumption.

Continuous production is a mass production method used to manufacture, produce, or process materials without interruption. Continuous production is called a continuous process or a continuous flow process because the materials, either dry bulk or fluids that are being processed, are continuously in motion, undergoing chemical reactions or subject to mechanical or heat treatment. Continuous usually means operating 24 hours per day, seven days per week with infrequent maintenance shutdowns, such as semi-annual or annual.

SUMMARY

Embodiments of the present invention disclose a method, computer program product, and system for integrated supply chain management with anomaly detection. An order schedule has one or more orders, each of which has a production requirement and a due date. An asset schedule has asset commitments associating assets with orders. Each asset has equipment specifications, including an asset class and one or more operational thresholds. The computer system identifies an asset of a class corresponding to a production requirement of an order and modifies the asset schedule to commit the asset to the order prior to the due date of the order. The computer system receives sensor input for the asset and determines whether an anomaly exists. If so, the computer system commits a second asset to the order.

DETAILED DESCRIPTION

Embodiments of the present invention recognize that equipment performance disruptions can hinder production and operations in a continuous process manufacturing operation. For example, in a mining operation, an unanticipated mechanical failure may cause a scheduling delay by increasing the time to transfer cargo from one carrier to another, which in turn delays the fulfillment of a customer order. Embodiments of the present invention recognize that routine maintenance inspections require substantial personnel, are limited to those portions of equipment which are amenable to visual inspection, and are not available in real time. Embodiments of the present invention provide a method for anticipating mechanical failures, scheduling maintenance for the failing equipment, and adjusting for the use of alternate equipment, thereby avoiding delays while decreasing maintenance costs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
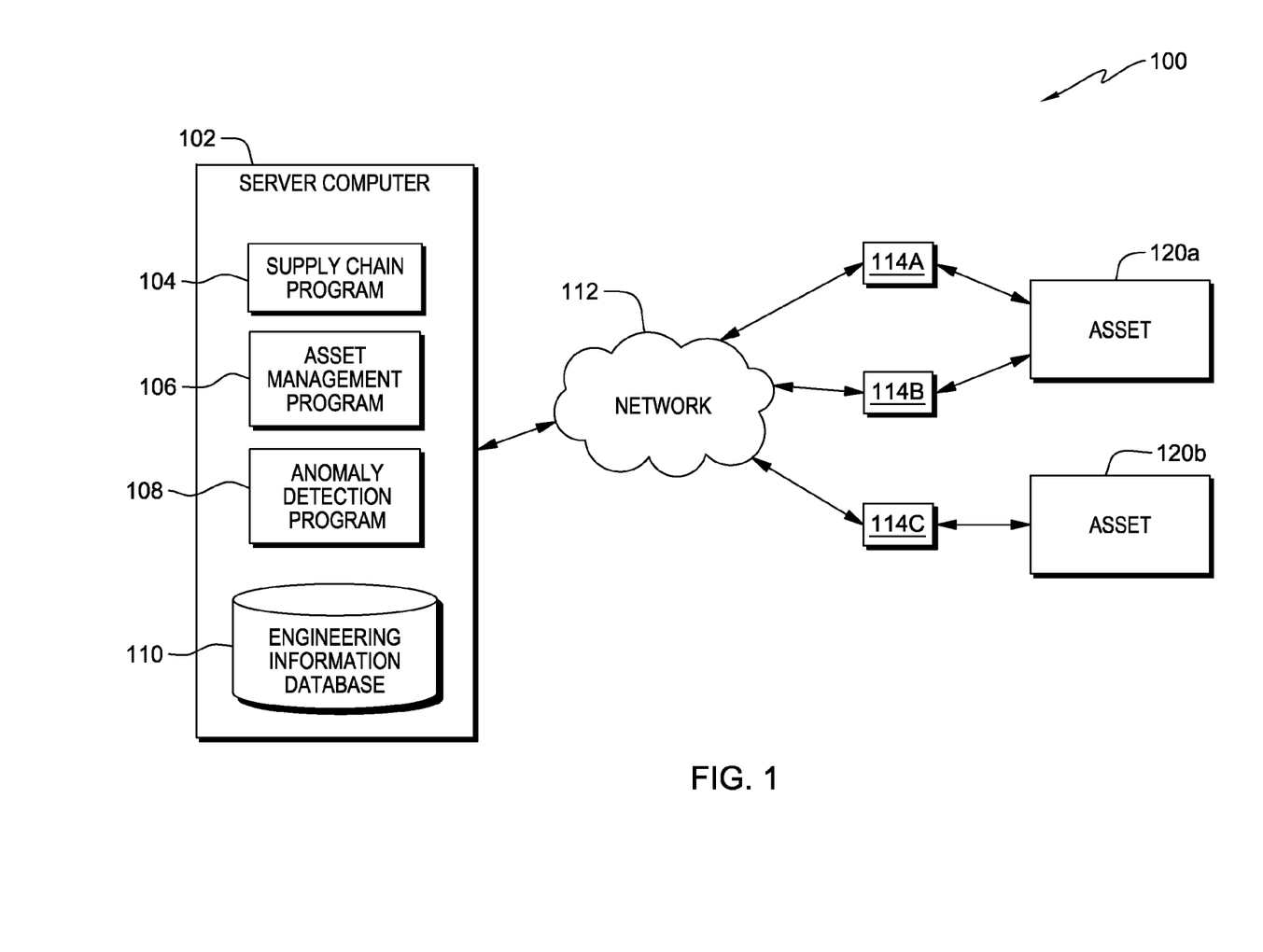
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention.

Distributed data processing environment 100 includes server computer 102 and one or more sensors 114A, 114B, and 114C all interconnected over network 112. Each of sensors 114A, 114B, and 114C monitors a measurement corresponding to at least one asset 120a, 120b. One or more of sensors 114A, 114B, and 114C may monitor a measurement corresponding to the same asset 120a, 120b. Assets include, for example, machinery and instrumentation. As an example, assets for a mining operation may include rotary car dumpers, reclaimers, stackers or conveyor belts.

Each of sensors 114A, 114B, and 114C may be a real-time indicator, a lagging indicator, or a historical indicator. A real-time indicator measures a condition as it occurs or with only a slight delay after it occurs. A real-time indicator may report measurements constantly or with a frequency, depending upon the condition being measured, the method of measurement, the type of asset, the precision required, and the bandwidth available. A real-time indicator may also report measurements on demand.

A lagging indicator measures a condition after it has occurred. For example, an engineer may take an oil sample from an asset and transport it for a viscosity analysis, in which case the viscosity measurement measures the condition of the oil at the time of sampling.

A historical indicator measures a condition over an interval of time. For example, a sensor may record the average RPM of a turbine over the preceding twenty-four hours. A historical indicator may report historical data in real time, with a frequency, or on demand. A historical indicator may count the number of occurrences of a monitored event over an interval of time, for example counting the number of times a measurement of RPM for a turbine fell below a known threshold in the preceding six hours.

Server computer 102 may be a laptop computer, tablet computer, netbook computer, personal computer (PC), a desktop computer, a personal digital assistant (PDA), a smart phone, or any programmable electronic device capable of communicating with sensors 114A, 114B, and 114C via network 112.

Server computer 102 includes supply chain program ("SCP") 104, asset management program ("AMP") 106, anomaly detection program ("ADP") 108, and engineering information database 110. In another embodiment, engineering information database 110 resides on a remote database server, with which server computer 102 is in communication. Server computer 102 is in communication with sensors 114A, 114B, and 114C.

An illustrative embodiment, including SCP 104, AMP 106, and ADP 108, is discussed in more detail in connection with FIG. 2.

SCP 104 receives an order from a customer. SCP 104 receives an asset schedule from AMP 106 and commits available assets to the order. SCP 104 sends the asset commitments to AMP 106 and ADP 108. SCP 104 receives an asset availability update from AMP 106 or ADP 108 and determines if an adjustment to an asset commitment is necessary. See step 314 in FIG. 3. If so, SCP 104 makes adjustments to the asset commitments and sends the adjustments to AMP 106 and ADP 108. SCP 104 is discussed in more detail in connection with FIG. 3.

AMP 106 determines asset use and availability and generates an asset schedule. AMP 106 receives an anomaly report from ADP 108. AMP 106 schedules a maintenance period for an asset in response to receiving user input, receiving a request (e.g., an anomaly report) from ADP 108, or receiving a request from SCP 104. AMP 106 sends an availability update to SCP 104 and/or ADP 108. AMP 106 receives a maintenance report, which may be received as user input. If the asset is not restored, AMP 106 schedules another maintenance period for the asset, which may be in response to receiving user input, receiving a request (e.g., an anomaly report) from ADP 108, or receiving a request from SCP 104. AMP 106 is discussed in more detail in connection with FIG. 4.

In another embodiment, the asset schedule comprises an order schedule and a maintenance schedule, which may reside separately, together, or as part of larger database. SCP 104 generates and maintains the order schedule, which includes commitments of one or more assets to one or more orders. SCP 104 identifies availabilities for an asset, an availability being a period of time during which the asset is not committed to an order. AMP 106 maintains a maintenance schedule, which includes commitments of one or more assets to one or more maintenance periods. The maintenance schedule includes routine maintenance (which may be recurring or one-time), maintenance commitments scheduled in response to user input, and maintenance commitments scheduled in response to an anomaly report. AMP 106 also maintains operational status information for one or more assets, an inventory of available spare parts, and a list of fault codes with corresponding maintenance information.

ADP 108 receives sensor input data from one or more sensors 114A, 114B, and 114C, each sensor corresponding to one or more assets. ADP 108 correlates the received sensor input data to one or more assets. ADP 108 receives operational data corresponding to the one or more assets from engineering information database 110, wherein the operational data may comprise one or more expected sensor input data values or one or more tolerances corresponding to the one or more assets. ADP 108 compares the sensor input data for an asset to the operational data for the asset and detects anomalies in the sensor input. An anomaly is an event associated with an asset that indicates a problem or deficiency with the functionality, efficiency, or operation of the asset. ADP 108 determines the anomaly conditions. ADP 108 sends an anomaly report to AMP 106 including characteristics of the anomaly. ADP 108 is discussed in more detail in connection with FIG. 5.

SCP 104, AMP 106, and ADP 108 may present a chart to a user (e.g., a Gantt chart), which may include an asset schedule with one or more asset commitments, one or more maintenance periods, and/or indicators of one or more anomalies.

Communication between and among SCP 104, AMP 106, and ADP 108 may utilize a semantic model. The semantic model may enable meaningful communications between programs. An example of the use of a semantic model is ADP 108 sending an anomaly report to AMP 106 and/or SCP 104. ADP 108 may determine an anomaly using, in part, a certain sensor input data value, although the data value may not be useful information for SCP 104 or AMP 106. Thus, the semantic model may enable ADP 108 to include information in the anomaly report that is useful to SCP 104 or AMP 106, such as, for example, the part of the asset to which anomaly corresponds, the degree to which throughput or efficiency is degraded, or an estimated time until failure.

Network 112 can be, for example, a local area network (LAN), a wide area network (WAN) such as the Internet, or a combination of the two, and can include wired, wireless, or fiber optic connections. In general, network 112 can be any combination of connections and protocols that will support communications between server computer 102 and sensors 114A, 114B, and 114C. Network 112 may include one or more automation controllers (e.g., Programmable Logic Controllers or Distributed Control Systems) connected to one or more sensors 114A, 114B, and 114C.

Figure 6:
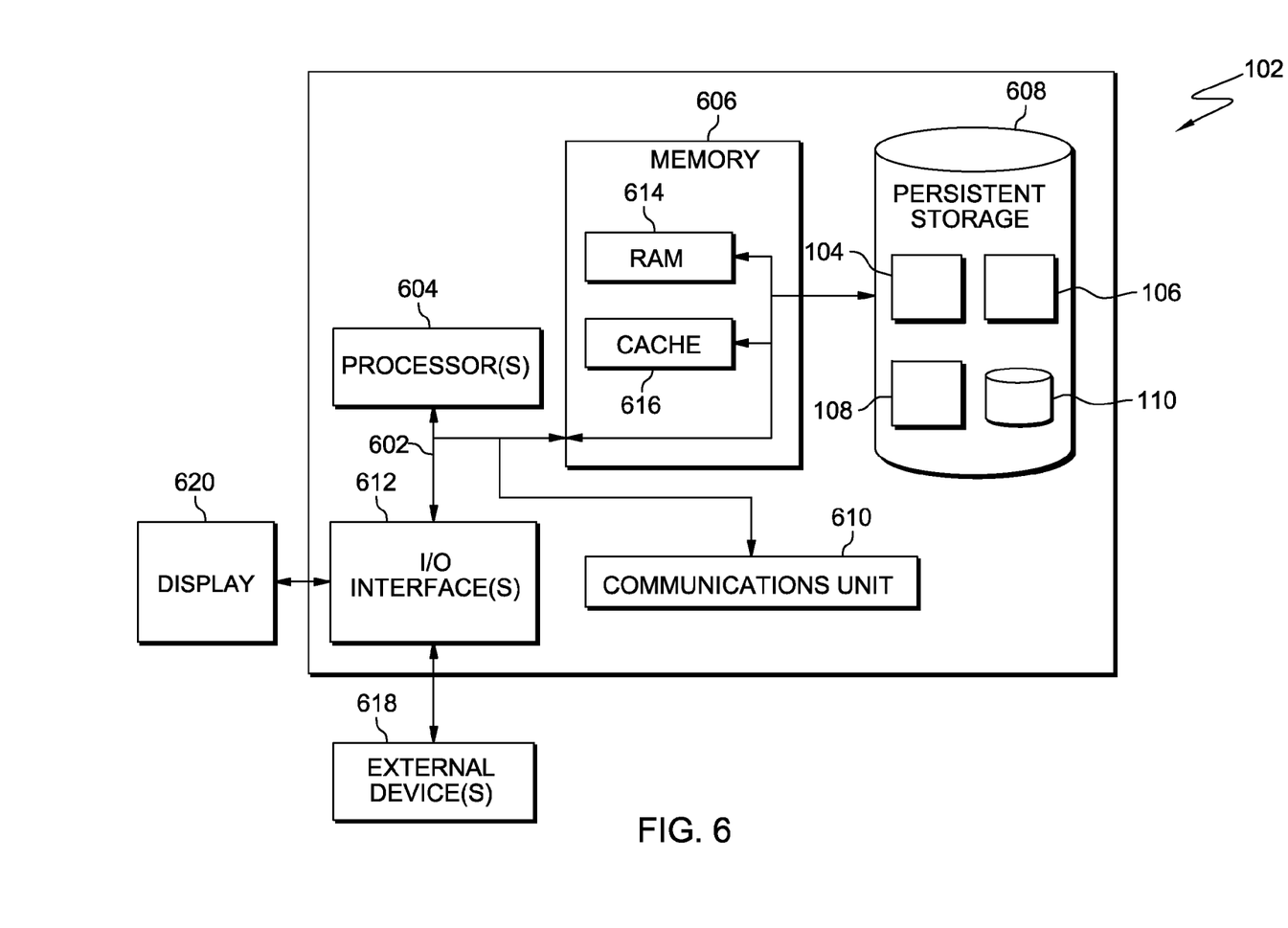
FIG. 6 depicts a block diagram of components of the server computer executing the SCP 104, AMP 106, and ADP 108, in accordance with an embodiment of the present invention.

Server computer 102 may include internal and external hardware components, as depicted and described in further detail with respect to FIG. 6.

Figure 2:
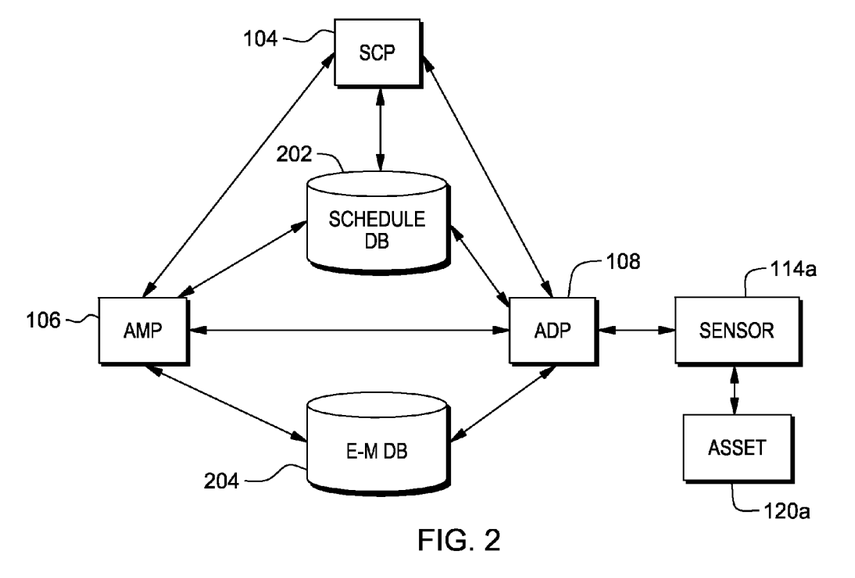
FIG. 2 depicts a block diagram of an implementation, in accordance with an illustrative embodiment of the present invention.

FIG. 2 depicts a block diagram of an implementation in accordance with an illustrative embodiment of the present invention. It should be appreciated that FIG. 2 provides only an illustration of one implementation and does not imply any limitations with regard to the variations or configurations in which different embodiments may be implemented. Many modifications to the depicted implementation may be made, some of which are discussed in connection to FIGS. 3-5.

SCP 104, AMP 106, and ADP 108 are in communication with one another and with schedule database 202. Schedule database 202 includes an asset schedule, the asset schedule including availability and commitment information corresponding to one or more assets. Schedule database 202 also includes information corresponding to one or more orders, such as order quantities, asset requirements, and fulfillment due dates. SCP 104, AMP 106, and/or ADP 108 may notify one another of changes to schedule database 202 by sending a notification of a change, or by other equivalent methods, including push notifications, active monitoring of schedule database 202, or other methods.

AMP 106 and ADP 108 are in communication with engineering and maintenance database (E-M DB) 204. E-M DB 204 includes operational data, the operational data corresponding to one or more assets and comprising one or more expected measurement values and/or tolerances. E-M DB 204 also includes maintenance information, the maintenance information corresponding to one or more assets and comprising a corrective action, a duration, and/or an urgency, each corresponding to an anomaly.

ADP 108 is in communication with sensor 114a. Sensor 114a monitors a measurement corresponding to asset 120a. ADP 108 may be in communication with sensor 114a by way of one or more automation controllers (e.g., Programmable Logic Controllers or Distributed Control Systems).

The remainder of this discussion of FIG. 2 is an example. SCP 104 receives an order as user input and, in response, determines that a forklift is required for eight hours to fulfill the order. SCP 104 stores the order in schedule database 202. SCP 104 retrieves an asset schedule from schedule database 202 and determines that a forklift is available. SCP 104 commits the forklift to the order for eight hours by modifying the asset schedule of the schedule database 202 with the order commitment.

Asset 120a is the forklift committed to the order. Sensor 114a monitors the tire pressure of a tire of the forklift (asset 120a). ADP 108 receives sensor input data from sensor 114a. ADP 108 retrieves operational data corresponding to asset 120a from E-M DB 204. ADP 108 compares the sensor input data received from sensor 114a to the operational data and, in response, determines that the tire pressure is above a minimum operational pressure threshold and below a maximum operational pressure threshold. ADP 108 thus does not detect an anomaly based on the thresholds. ADP 108 continues to monitor the sensor input data received from sensor 114a over time and determines that the tire pressure is steadily decreasing in an approximately linear fashion. ADP 108 extrapolates the amount of time until the tire pressure violates the minimum operational pressure threshold. ADP 108 determines an anomaly by prediction of the tire pressure and gathers the anomaly conditions. ADP 108 presents a plurality of tire pressure measurements, the extrapolation of future tire pressure values, and the predicted time until violation of the minimum operating pressure threshold to a user. ADP 108 receives confirmation of the detected anomaly and sends an anomaly report to SCP 104 and AMP 106. The anomaly report identifies the anomaly conditions, including identifying the asset (i.e., the forklift) and identifies the malfunctioning component of the asset (i.e., the tire monitored by sensor 114a).

AMP 106 receives the anomaly report and, in response, retrieves from E-M DB 204 maintenance information corresponding to the asset identified in the anomaly report (i.e., the forklift). AMP 106 may retrieve further maintenance information from E-M DB 204 corresponding to the malfunctioning component (i.e., the tire). In this example, the maintenance information identifies the corrective action as replacement, the duration as one hour, and the urgency as immediate. AMP 106 schedules the forklift for immediate maintenance by modifying the asset schedule of schedule database 202.

SCP 104 receives an asset availability update indicating that the forklift is now committed to maintenance for one hour. SCP 104 determines than an order commitment has changed and, in response, determines that an adjustment is required. SCP 104 determines that the order requires one forklift and commits a second forklift to the order. SCP 104 modifies the asset schedule of schedule database 202 with the order commitment for the second forklift.

AMP 106 receives a maintenance report (e.g., as user input) indicating that the corrective action is complete and the asset is restored to functionality. AMP 106 modifies the asset schedule to terminate the maintenance commitment corresponding to the asset.

SCP 104 receives an asset availability update indicating that the first forklift is now available, the maintenance commitment having terminated. SCP 104 determines that the second forklift is still committed to the order and that no other order commitments changed. SCP 104 determines that no adjustment is required.

Figure 3:
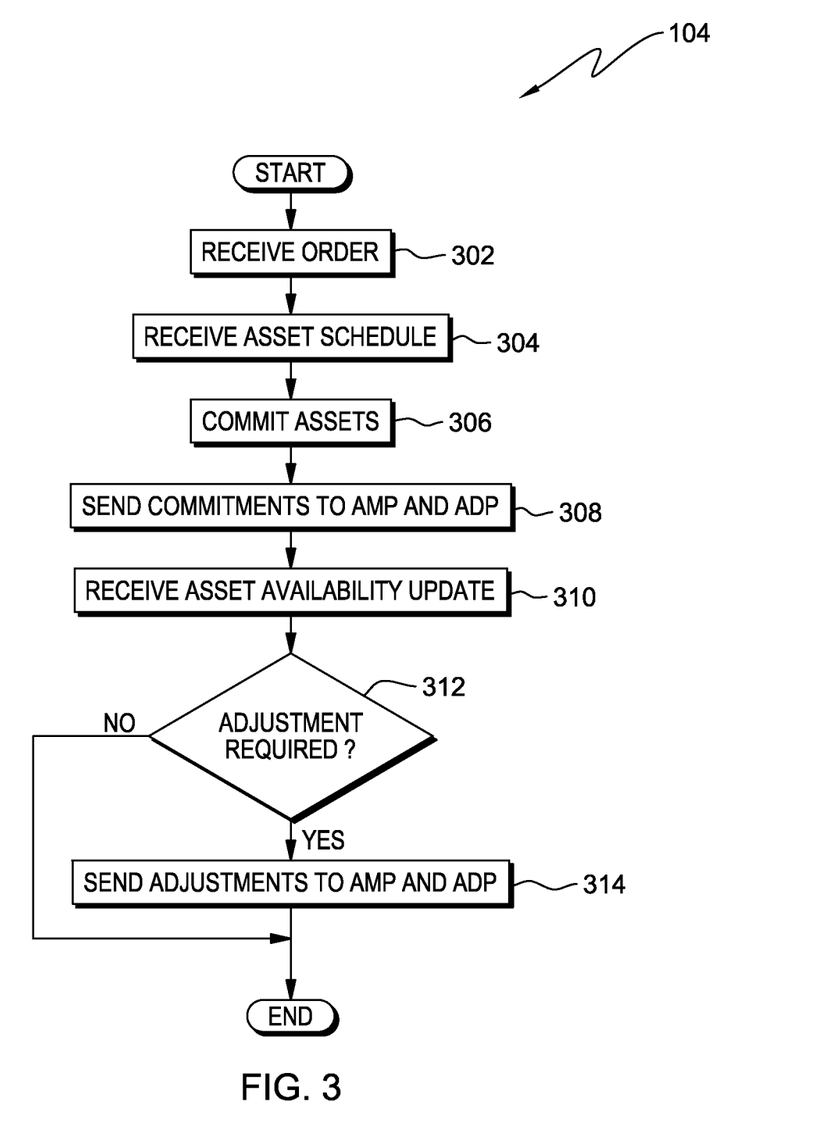
FIG. 3 is a flowchart depicting operational steps of supply chain program ("SCP") 104 for scheduling and adjusting asset commitments, in accordance with an embodiment of the present invention.

FIG. 3 is a flowchart depicting operational steps of supply chain program ("SCP") 104 for scheduling and adjusting asset commitments, in accordance with an embodiment of the present invention.

SCP 104 receives an order (step 302). SCP 104 may receive the order as user input or, for example, as input from a database. The order may include, for example, a customer name, an amount of product ordered, the method of fulfillment, and the target due date for fulfillment. The method of fulfillment may be, for example, bulk material transport such as by train, shipping by post or a common carrier, or direct retrieval by the customer.

SCP 104 receives an asset schedule from AMP 106 (step 304). The asset schedule indicates asset availability and commitments. An asset committed to an order is unavailable and cannot be committed to another order. However, availability is specific to particular times, as an asset may become available after completion of the order, in which case the asset may be committed to another order after completing the first order.

SCP 104 commits some or all of the available assets (step 306) to the order. SCP 104 selects assets from the available assets so that the selected assets are sufficient to fulfill the order within the time specified by the order. The asset commitment may be for a specified time frame, such as reserving a crane for a period of hours in order to unload a container ship. Alternatively, the time frame may be indefinite, such as when reserving inventory not expected to return after order fulfillment.

SCP 104 sends the asset commitments to AMP 106 and ADP 108 (step 308). The notification from SCP 104 to AMP 106 may identify the committed asset, the order, and/or the time frame of the commitment. In an embodiment, SCP 104 receives confirmation from AMP 106 that AMP 106 updated the asset schedule to reflect that the assets are committed. In another embodiment, SCP 104 receives confirmation of asset availability (e.g., from AMP 106) before committing the assets to an order.

In an illustrative example of steps 302 through 308, SCP 104 schedules asset commitments. In this example, SCP 104 receives (step 302) an order for five-hundred units for delivery by truck to a specified address within seven days. SCP 104 receives an asset schedule (step 304) indicating that the available assets include: four-hundred units in inventory, production capacity of fifty units per day, and a cargo truck available to make the delivery in four days. SCP 104 commits assets to the order (step 306), the committed assets comprising all of the units held in inventory, the next one-hundred units of production capacity, and the cargo truck for the first available time frame sufficient to deliver the order. SCP 104 sends the asset commitments to AMP 106 and ADP 108 (step 308).

Resuming discussion of FIG. 3, SCP 104 receives an asset availability update (step 310) that SCP 104 may receive from, for example, AMP 106 or ADP 108. SCP 104 may receive an asset availability update (step 310) in response to a change to the asset schedule. SCP 104 may receive the asset availability update as user input or from a database. For example, if a customer cancels an order, any assets committed to that order may be uncommitted and therefore available. In this case, the number of available assets increases.

SCP 104 determines if an adjustment to the asset commitments is required (decision 312) responsive to receiving an asset availability update. If the adjustment affects only assets that are available, no adjustments to any asset commitments are required (NO branch, decision 312). An adjustment to available assets may require adjustment of asset commitments (YES branch, decision 312). For example, SCP 104 may receive an asset adjustment from ADP 108 indicating than an asset has ceased to function. If the broken asset is committed to an order, an adjustment to the asset commitments for that order is required (YES branch, decision 312). In such a case (YES branch, decision 312), SCP 104 may commit another asset to the order in place of the now-unavailable asset.

In some embodiments, SCP 104 may receive an asset availability update (step 310) from ADP 108. SCP 104 may receive an anomaly report from ADP 108, the anomaly report identifying an asset. SCP 104 may take no action in response to the anomaly report. Alternatively, SCP 104 may modify one or more order commitments corresponding to the asset, such as by removing the asset from all current and future order commitments or by temporarily preferring another asset when committing assets to orders. For example, if a first and second rotary car dumper is each available to commit to an order, SCP 104 may commit the second rotary car dumper in response to having recently received an anomaly report identifying the first rotary car dumper.

In some embodiments, SCP 104 may receive an asset availability update (step 310) from AMP 106. For example, if an asset requires maintenance, that asset is unavailable during the maintenance commitment. In this case, the number of available assets decreases. SCP 104 may also receive an asset availability update wherein the number of available assets remains the same, for example if an asset is replaced or upgraded.

In some embodiments, SCP 104 may track the number and frequency of anomaly reports for two or more assets and, when selecting an asset to commit to an order, may select one of two or more assets having fewer anomaly reports. In a variation of this embodiment, SCP 104 may use the number and frequency of anomaly reports since the last maintenance commitment for each asset.

In some embodiments, assets may include, for example, machinery, labor or manpower, or instrumentation. An asset may have a useful life of more than one order. For example, a delivery truck may make many deliveries and may last many years with only routine maintenance or even with no maintenance. Assets may include goods held as inventory, even though the goods may be perishable and even though, once an order is fulfilled, the delivered goods cannot be committed to a second order.

In some embodiments, two or more related assets may be grouped, so that changing the availability of one asset of the group changes the available of each other asset of the group accordingly. For example, a group may comprise a rotary car dumper and a stacker. In this example, committing the rotary car dumper to an order also commits the stacker to the same order. Similarly, if either of the grouped assets requires maintenance and so is unavailable, the other of the grouped assets is also unavailable and cannot be committed to an order.

In some embodiments, a class of assets may be grouped with another class of assets. For example, rotary car dumpers may be grouped with stackers, so that committing a first rotary car dumper to an order also commits a stacker of a plurality of stackers to the same order. Groups may include one or more asset from each of one or more groups.

Figure 4:
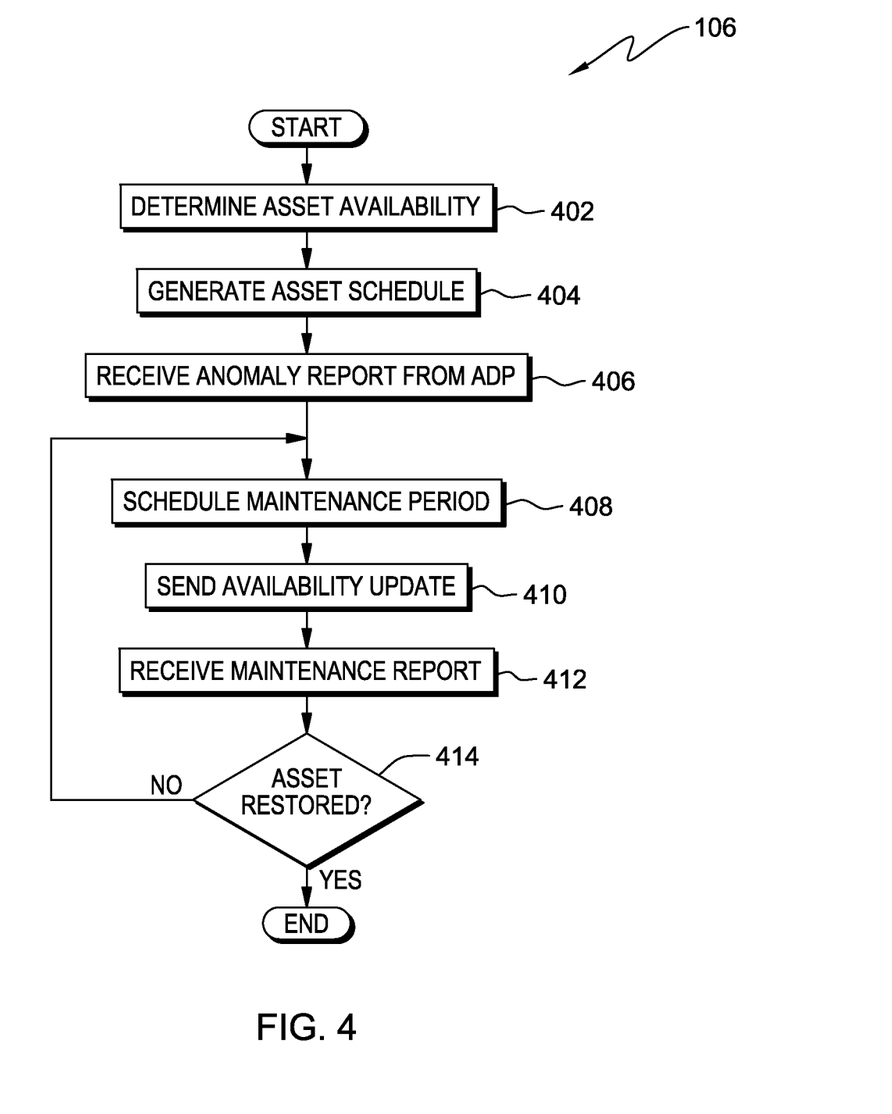
FIG. 4 is a flowchart depicting operational steps of asset management program ("AMP") 106 for determining an asset schedule and scheduling maintenance, in accordance with an embodiment of the present invention.

FIG. 4 is a flowchart depicting operational steps of AMP 106, in accordance with an embodiment of the present invention. In the depicted embodiment, AMP 106 determines an asset schedule and schedules maintenance for assets.

AMP 106 determines availability of one or more assets (step 402). The availability information for each asset may identify one or more past, present, and/or future commitments corresponding to the asset. Future commitments for an asset may include information corresponding to an order, a start date and time for the commitment, and an end date and time for the commitment.

AMP 106 generates the asset schedule (step 404). The asset schedule comprises availability and commitment information for one or more assets. In an embodiment, AMP 106 generating the asset schedule comprises: AMP 106 receiving a list of one or more assets, the list comprising one or more asset commitments, and AMP 106 generating an asset schedule reflecting the times of unavailability corresponding to each asset commitment.

AMP 106 receives an anomaly report from ADP 108 (step 406). The anomaly report identifies an asset and an anomaly corresponding to the asset. The anomaly report may include anomaly details of the anomaly. The anomaly report may also include a measure of the efficiency at which the asset is operating.

AMP 106 schedules a maintenance period for the asset identified in the received anomaly report (step 408). In an embodiment, scheduling a maintenance period comprises the steps of: determining a corrective action, determining a duration of the corrective action, determining an urgency of the corrective action, and adjusting the asset schedule. In this embodiment, the asset is unavailable for commitment to an order during the maintenance period, but may undergo maintenance or replacement.

AMP 106 sends asset schedule availability updates to SCP 104 (step 410). AMP 106 may also send asset schedule availability updates to ADP 108. AMP 106 may send the asset schedule, a reference to the asset schedule, the adjusted portions of the asset schedule, or information indicating the adjustments.

AMP 106 receives a maintenance report (step 412), which may be received as user input, or may be received from ADP 108. In an embodiment, AMP 106 receives the maintenance report after completion of the corrective action. The maintenance report may identify an asset and an operational status for the asset. The maintenance report may include other information relating to the asset, for example, the time, date, and nature of any corrective action performed on the asset, the outcome of the corrective action, and/or an identifier for the individual or individuals who performed the corrective action. AMP 106 may receive the maintenance report before, during, or after the maintenance period for the asset.

If the operational status of the maintenance report indicates that the asset is restored to functionality (YES branch, decision 414), then the asset becomes available upon completion of the maintenance period. In an embodiment, AMP 106 ends the maintenance period in response to the maintenance report indicating that the asset is restored to functionality.

If the operational status of the maintenance report indicates that the asset is not restored to functionality (NO branch, decision 414), then AMP 106 returns to step 410 to schedule an additional maintenance period for the asset. In this case, the maintenance report may include information regarding the duration of the additional maintenance period. The additional maintenance period may be contiguous with another maintenance period for that asset, or the two may be separated by an interval of time.

In some embodiments, AMP 106 determines a corrective action for the anomaly identified in the anomaly report received from ADP 108, the corrective action having both a duration and an urgency. AMP 106 may receive the corrective action, duration, and/or urgency from a maintenance database, the corrective action, duration, and/or urgency being associated with an anomaly. The maintenance database may be integrated with AMP 106 or may reside independently of AMP 106, for example on permanent storage communicatively connected to server computer 102. The maintenance database may reside within engineering information database 110.

In some embodiments, the duration of the corrective action may be temporary (e.g., for a corrective action such as a repair) or indefinite (e.g., in the event of irreparable failure). The urgency of the corrective action may be an indication of when corrective action should occur in order to optimize availability of the asset. A corrective action may have a high urgency value if, for example, an asset is stolen or destroyed. A corrective action may have a low urgency value if, for example, the reported anomaly will not negatively affect performance of the asset. The urgency of a corrective action may include a due date for commencing or completing the corrective action. For example, an anomaly report may predict an asset failure within two weeks and set a two-week due date for commencing a corrective action. In this case, AMP 106 schedules the maintenance period prior to the due date. AMP 106 may schedule the maintenance period during a time in which the asset schedule indicates the asset is available, thereby avoiding disruption of any orders or asset commitments. However, if no times are available before a due date of a corrective action, or if the urgency of the corrective action is high (e.g., compared to a learned or known threshold), then AMP 106 may schedule the maintenance period regardless of availability of the asset, which may ultimately require adjustment of other asset commitments. AMP 106 schedules the maintenance period by adjusting the asset schedule to reflect that the asset is unavailable for a period equal to the duration of the corrective action.

In some embodiments, AMP 106 requests an available time from SCP 104, the available time being one when the asset schedule indicates that the asset is available, thereby avoiding disruption of any orders or asset commitments. In another embodiment, AMP 106 receives user input identifying a time for which to schedule a maintenance commitment.

In some embodiments, AMP 106 also maintains a preventative maintenance requirement for one or more assets, maintains a preventative maintenance schedule for one or more assets, maintains an inventory of available spare parts, generates a maintenance work order, and/or maintains a list of fault codes with corresponding maintenance information.

In some embodiments, the step of AMP 106 generating the asset schedule (step 404) comprises AMP 106 sending the asset schedule to SCP 104 and ADP 108. The asset schedule may reside within AMP 106. Alternatively, the asset schedule may be independent of AMP 106 (see FIG. 5 and accompanying discussion), in which case AMP 106 sending the asset schedule to SCP 104 and ADP 108 may comprise AMP 106 sending to SCP 104 and ADP 108 a reference to the asset schedule. In another embodiment, the asset schedule may reside, for example, in permanent storage communicatively connected to server computer 102, in which case SCP 104, AMP 106, and/or ADP 108 may retrieve the asset schedule from the permanent storage.

Figure 5:
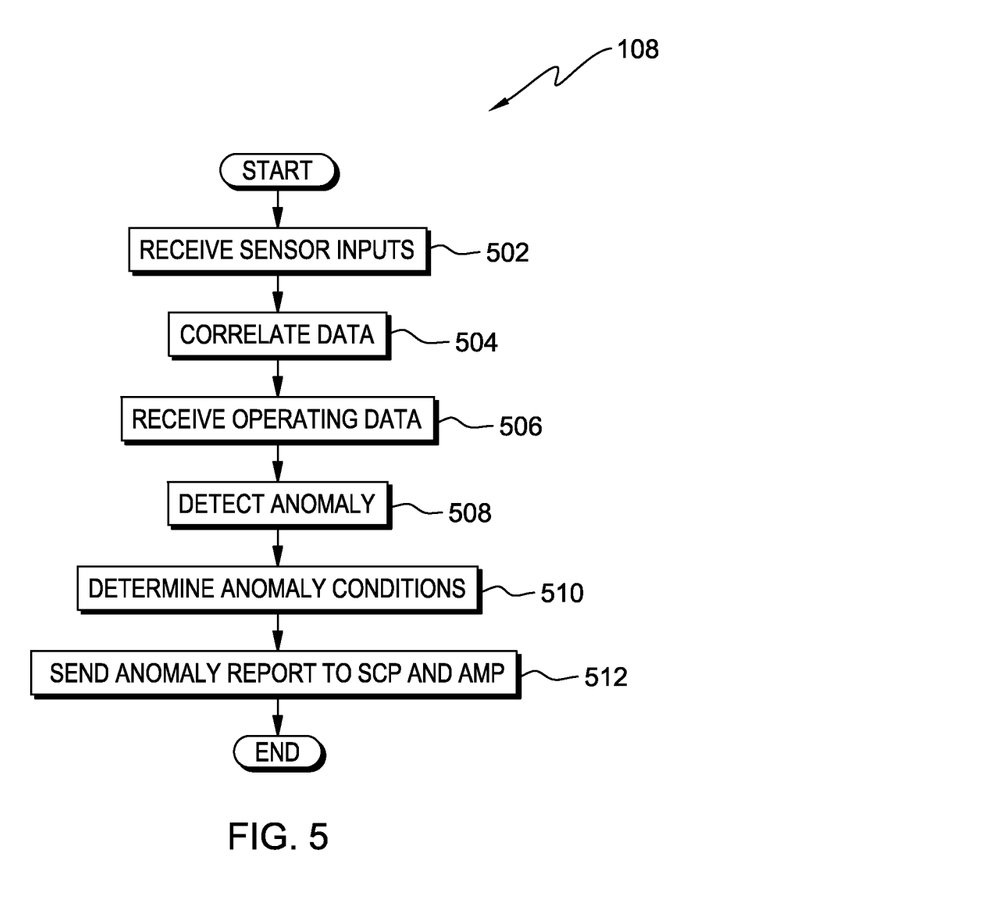
FIG. 5 is a flowchart depicting operational steps of anomaly detection program ("ADP") 108 for detecting anomalies of monitored assets, in accordance with an embodiment of the present invention.

FIG. 5 is a flowchart depicting operational steps of anomaly detection program ("ADP") 108 for detecting anomalies of monitored assets, in accordance with an embodiment of the present invention.

ADP 108 receives sensor input data from one or more sensors 114A, 114B, and 114C (step 502). In various embodiments of the present invention, each of sensors 114A, 114B, and 114C measures a condition corresponding to an asset. A measured condition may include, for example, pressure, weight, temperature, force, voltage, or revolutions-per-minute (RPM). The type of sensor used for an asset may vary depending upon the asset, as certain measurements convey no meaning for certain assets (e.g., RPM conveys no meaning for an asset without revolving parts).

ADP 108 correlates received sensor input data (step 504), which may include correlating received sensor input data with a corresponding asset, correlating lagging indicators with the time of measurement, and/or correlating sensor input data to other sensor input data.

ADP 108 receives operational data (step 506), which may be received from engineering information system database 110. Engineering information system database 110 may comprise information corresponding to one or more assets. The information may include one or more thresholds corresponding to the one or more assets, such as optimum efficiency ranges, safe operating ranges, and mechanical tolerances. In an embodiment, optimum efficiency ranges will include a smaller set of values than safe operating ranges, which will include a smaller set of values than mechanical tolerances. The operational data may also include equipment specifications and/or a list of measurements relevant to the asset. Alternatively, ADP 108 may determine the measurements relevant to an asset, for example, by receiving one or more thresholds for the asset, each threshold identifying a measurement.

ADP 108 detects an anomaly (step 508) by comparing the received sensor input data for an asset to the operational data for the asset. In an embodiment, ADP 108 detects an anomaly by determining whether the value of a sensor input data violates a threshold of the operational data and, if so, detecting an anomaly. In this embodiment, a sensor input data value violates a threshold if the value is not within the threshold values, for example if the sensor input data value is above a maximum threshold value or if the sensor input data is below a minimum threshold value.

ADP 108 determines anomaly conditions (step 510), which may include information relating to an asset, a detected anomaly for the asset, a measurement, a threshold associated with the detected anomaly, a predicted anomaly, or an efficiency reduction. Determining anomaly conditions may include the step of presenting a user with determined anomaly conditions and receiving user input indicating whether a detected anomaly was accurate, thereby providing a user with an opportunity to override the detection of an anomaly. A user may choose to override a detected anomaly if, for example, the user is aware of an environmental condition causing the anomaly, such as incline causing an engine of a laden truck to increase its RPMs without any gain in speed of the truck.

ADP 108 sends an anomaly report to SCP 104 and AMP 106 (step 512) in response to detecting an anomaly. In an embodiment, an anomaly report includes determined anomaly conditions.

In an illustrative example, ADP 108 detects and reports an anomaly for a drill by prediction. Sensors 114A, 114B, and 114C measures a temperature of the drill bit in real time. ADP 108 receives sensor input data from sensors 114A, 114B, and 114C. ADP 108 correlates the received data to the drill bit of the drill. ADP 108 receives operational data for the drill from engineering information database 110. The operational data includes a mechanical tolerance corresponding to a maximum operating temperature of the drill bit. ADP 108 compares the received sensor input data to the maximum operating temperature mechanical tolerance and determines that the temperature of the drill bit is currently 85% of the maximum operating temperature and is trending upwards, with a predicted time to exceeding the maximum operating temperature of four minutes. ADP 108 detects an anomaly based on the current and predicted future temperatures of the drill bit and determines the conditions of the anomaly. In response to receiving user input confirming detection of an anomaly, ADP 108 sends an anomaly report to SCP 104 and AMP 106. The anomaly report identifies the drill bit of the drill, the heat tolerance of the drill bit, the current temperature of the drill bit, and the predicted time until the heat reaches the maximum operating temperature of the drill bit.

In some embodiments, ADP 108 may detect an anomaly in response to, for example, a single threshold violation, a known or learned number of threshold violations, a known or learned frequency of threshold violations within a known or learned time interval, a known or learned degree of threshold violation, or a combination thereof. For example, ADP 108 may detect an anomaly for a vehicle in response to a sensor reporting tire pressure values in violation of an optimum efficiency threshold by five or more pounds per square inch (PSI) for more than ten seconds at a time, more than twice in eight hours. Thus, a bump in the road may momentary increase the tire pressure above the optimum efficiency threshold, but would not cause ADP 108 to detect an anomaly in this embodiment.

In some embodiments, correlating sensor input data from two or more sensors 114A, 114B, and 114C may lead to detection of an anomaly which is not evident by a single measure. For example, if sensor input data for a drill bit indicates increased temperature and decreased rotational speed, even if each is within all corresponding thresholds, the combination of the two values may be anomalous. For example, high temperature combined with low rotational speed may be anomalous. ADP 108 may further correlate the values with information regarding the operating conditions of the asset, for example, the density of the material the drill bit is drilling. For example, the values may be an anomaly if the drill bit is passing through low density material.

In some embodiments, ADP 108 may predict or forecast future values of input data, for example by performing regression analysis or trend estimation on a plurality of measurements corresponding to different points in time.

In some embodiments, ADP 108 may also detect anomalies (step 508) by determining an efficiency value for an asset. The efficiency calculated may be, for example, mechanical efficiency, electrical efficiency, or thermodynamic efficiency. In determining the efficiency value for an asset, ADP 108 may utilize sensor input data from one or more sensors 114A, 114B, and 114C corresponding to the asset. For example, ADP 108 may receive sensor input data corresponding to a motor of a rotary car dumper, the data including input voltage, input current, output torque, and output angular velocity or RPM, and ADP 108 may compute the electrical efficiency of the motor by comparing the mechanical output power to the electrical input power. ADP 108 may correlate the efficiency with one or more other sensor input data, such as RPM, and compare the two or more sensor input data to a threshold corresponding to the asset. ADP 108 may determine that an efficiency value below the optimum operating threshold for an asset is anomalous.

In some embodiments, ADP 108 detects anomalies (step 508) by determining trends in efficiency over time. ADP 108 may determine that a downward trend in efficiency indicates an impending mechanical failure. ADP 108 may receive a data model for an asset (for example, from engineering information system 110), compare efficiency values for the asset to the data model, and determine that the efficiency trend is an anomaly.

In some embodiments, ADP 108 detects anomalies only for certain assets or only at certain times. For example, ADP 108 may detect anomalies for only those assets with a current or future order commitment, in which case ADP 108 may ignore or discard sensor input data for an asset which is available or committed to maintenance. Alternatively, ADP 108 may detect anomalies for all assets except for an asset committed to maintenance. Alternatively, ADP 108 may detect anomalies for all assets at all times.

In some embodiments, ADP 108 sends an identical anomaly report to SCP 104 and AMP 106. In some embodiments, ADP 108 sends an anomaly report to SCP 104 different from the anomaly report ADP 108 sends to AMP 106. Such differences may include, for example, variations in the contents of the anomaly report, for example to address different semantic equivalencies used by SCP 104 and AMP 106 based on the semantic model.

FIG. 6 depicts a block diagram of components of server computer 102 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Server computer 102 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

SCP 104, AMP 106, ADP 108, and engineering information database 110 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid-state drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of enterprise grid 112 and client devices 104, 106, and 108. In these examples, communications unit 610 includes one or more network interface cards. Communications unit 610 may provide communications through the use of either or both physical and wireless communications links. SCP 104, AMP 106, ADP 108, and engineering information database 110 may be downloaded to persistent storage 608 through communications unit 610.

I/O interface(s) 612 allows for input and output of data with other devices that may be connected to server computer 102. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., SCP 104, AMP 106, ADP 108, and engineering information database 110, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for anomaly detection, the computer program product comprising:

a server computer comprising one or more processors, the one or more processors comprising one or more non-transitory computer-readable storage media and program instructions stored on the one or more computer-readable storage media, the program instructions comprising: a supply chain program (SCP), an asset management program (AMP) and an anomaly detection program (ADP);

the SCP including program instructions to receive a first order, receive an asset schedule from the AMP, commit a first asset of one or more assets to the first order, the first asset having an asset class corresponding to a first production requirement of the first order, send the first asset commitment to the AMP and the ADP, and modify the asset schedule with the first asset commitment, the first asset commitment associating the first asset with the first order for a period of time prior to a first due date of the first order;

the AMP including program instructions to determine use and availability of the one or more assets and generate the asset schedule, and to send an asset availability update to the SCP and the ADP, the ADP including program instructions to determine whether a sensor input violates one or more operational thresholds, including to determine a future value of the sensor input, the future value corresponding to a time; and to determine whether the future value violates an operational threshold of the one or more operational thresholds, and, if so, identify an anomaly of the first asset, send an anomaly report to the SCP and the AMP, the ADP program instructions further including to present to a user at least one of the one or more threshold values and the input, including the future value and the time; and receive user input, the user input confirming the anomaly;

the SCP further including program instructions to, in response to the asset availability update, adjust the asset commitment of the first asset and send the adjusted asset commitment to the AMP and the ADP; and the SCP further including program instructions to, in response to the anomaly report, determine a second asset with a production capability corresponding to the first production requirement; and modify the first asset commitment to associate the second asset with the first order for the period of time prior to the due date of the first order.

2. The computer program product of claim 1, wherein the ADP includes program instructions to: receive a duration of a corrective action associated with anomaly; and associate the first asset with a maintenance commitment, the maintenance commitment having a duration at least equal to the duration of the corrective action.

3. The computer program product of claim 1, wherein the SCP includes program instructions to: receive an asset availability update for a third asset associated with a second order; and determine whether the asset availability update requires an adjustment to an asset commitment for the third asset and, if so, identify a fourth asset with an asset class corresponding to a second production requirement of the second order and, in response, modify the asset schedule with a second asset commitment, the second asset commitment associating the fourth asset with the second order.

4. The computer program product of claim 1, wherein the program instructions to modify the first asset commitment further comprise program instructions to disassociate the first asset with the first order.

5. The computer program product of claim 1, wherein the ADP includes program instructions to: receive equipment specifications for each of the one or more assets, the equipment specifications including an asset class and one or more operational thresholds; and receive the sensor input from one or more sensors, each sensor of the one or more sensors monitoring a measure of a component of the first asset.

6. The computer program product of claim 5, wherein the program instructions to determine whether the sensor input violates one or more operational thresholds further comprise program instructions to: determine whether the sensor input violates the one or more operational thresholds and, if so, determine a frequency corresponding to the sensor input violating the one or more operational threshold; and determine whether the frequency exceeds a frequency threshold, the frequency threshold corresponding to the component of the first asset.

7. The computer program product of claim 1, wherein the server computer further comprises a database to maintain one or both of an order schedule and the asset schedule, the order schedule comprising one or more orders, each of the one or more orders comprising a production requirement and a due date, and the asset schedule comprising one or more asset commitments associating one or more assets with the one or more orders.

* * * * *